United States Patent
Lachenmaier et al.

(10) Patent No.: US 12,416,256 B2
(45) Date of Patent: Sep. 16, 2025

(54) MANIFOLD, A TURBOMACHINE INCLUDING SUCH A MANIFOLD, A TURBOCHARGER INCLUDING SUCH A TURBOMACHINE, AND AN INTERNAL COMBUSTION ENGINE INCLUDING SUCH A MANIFOLD

(71) Applicant: Rolls-Royce Solutions GmbH, Friedrichshafen (DE)

(72) Inventors: Nicolas Lachenmaier, Altshausen (DE); Tim Refert, Tettnang (DE); Tobias Männle, Ravensburg (DE)

(73) Assignee: Rolls-Royce Solutions, GmbH, Friedrichshafen (DE)

( * ) Notice: Subject to any disclaimer, the term of this patent is extended or adjusted under 35 U.S.C. 154(b) by 0 days.

(21) Appl. No.: 18/363,895

(22) Filed: Aug. 2, 2023

(65) Prior Publication Data
US 2023/0383687 A1 Nov. 30, 2023

Related U.S. Application Data

(63) Continuation of application No. PCT/EP2022/052557, filed on Feb. 3, 2022.

(30) Foreign Application Priority Data

Feb. 5, 2021 (DE) .................... 10 2021 201 115.2
Feb. 3, 2022 (WO) ................. PCT/EP2022/052557

(51) Int. Cl.
*F01N 13/10* (2010.01)
*F02B 37/00* (2006.01)
(Continued)

(52) U.S. Cl.
CPC .............. *F01N 13/10* (2013.01); *F02B 37/00* (2013.01); *F04D 17/10* (2013.01); *F04D 29/441* (2013.01)

(58) Field of Classification Search
CPC . F01N 3/10; F02B 37/00; F04D 17/10; F04D 29/441; F01D 25/30;
(Continued)

(56) References Cited

U.S. PATENT DOCUMENTS 5,579,643 A * 12/1996 McEwen .............. F02B 37/025
                                                                415/151
10,519,812 B2 12/2019 Itoh et al.
(Continued)

FOREIGN PATENT DOCUMENTS

DE     10 2009 035 558 A1    4/2011
JP          2020-172908 A    10/2020

OTHER PUBLICATIONS

The International Search Report and the Written Report of the International Research Authority dated May 13, 2022 (12 pages).

*Primary Examiner* — Dapinder Singh
(74) *Attorney, Agent, or Firm* — TAYLOR & EDELSTEIN, PC (57) ABSTRACT

A manifold for deflecting a flow of a medium flowing through the manifold from an inlet side of the manifold to an outlet side of the manifold includes: the inlet side; a wall at least partially defining and thereby restricting a flow volume of the manifold; and a diffuser section arranged centrally in the flow volume on the inlet side, the diffuser being a single component with the wall.

9 Claims, 7 Drawing Sheets

(51) Int. Cl.
*F04D 17/10* (2006.01)
*F04D 29/44* (2006.01)

(58) Field of Classification Search
CPC ............ F05D 2220/30; F05D 2220/40; F05D 2250/51; F05D 2250/551
See application file for complete search history.

(56) References Cited

U.S. PATENT DOCUMENTS

| | | | |
|---|---|---|---|
| 10,731,546 B2* | 8/2020 | McHenry | F01D 17/105 |
| 10,774,663 B2 | 9/2020 | Leitel et al. | |
| 11,162,509 B2* | 11/2021 | Dietrich | F02B 37/00 |
| 11,255,202 B2* | 2/2022 | Keating | F01D 9/026 |
| 2013/0000300 A1* | 1/2013 | O'Hara | F01D 9/026 |
| | | | 60/605.1 |
| 2014/0086728 A1* | 3/2014 | Engert | F04D 29/664 |
| | | | 415/208.1 |
| 2015/0361985 A1 | 12/2015 | Edwards et al. | |
| 2017/0370249 A1* | 12/2017 | Itoh | F01D 17/105 |
| 2020/0217225 A1 | 7/2020 | Senn et al. | |

\* cited by examiner

MANIFOLD, A TURBOMACHINE INCLUDING SUCH A MANIFOLD, A TURBOCHARGER INCLUDING SUCH A TURBOMACHINE, AND AN INTERNAL COMBUSTION ENGINE INCLUDING SUCH A MANIFOLD

CROSS REFERENCE TO RELATED APPLICATIONS

This is a continuation of PCT application no. PCT/EP2022/052557, entitled "MANIFOLD TURBOMACHINE COMPRISING SUCH A MANIFOLD, TURBOCHARGER COMPRISING SUCH A TURBOMACHINE, AND AN INTERNAL COMBUSTION ENGINE COMPRISING SUCH A MANIFOLD", filed Feb. 3, 2022, which is incorporated herein by reference. PCT application no. PCT/EP2022/052557 claims priority to German patent application no. 10 2021 201 115.2, filed Feb. 5, 2021, which is incorporated herein by reference.

BACKGROUND OF THE INVENTION

1. Field of the Invention

The present invention relates to an internal combustion engine, and, more particularly, to a manifold.

2. Description of the Related Art

The invention relates to a manifold, a turbomachine including such a manifold, a turbocharger, including such a turbomachine, and an internal combustion engine including such a manifold.

In a manifold through which a medium flows from an inlet side to an outlet side, the problem of pressure loss across the manifold invariably occurs. If such a manifold is used in the exhaust tract of an internal combustion engine, the amount of exhaust effort to be performed by the internal combustion engine increases. As a result, the efficiency of the internal combustion engine deteriorates. Especially critical are the pressure losses which occur downstream from a turbine, for example a turbocharger. In particular, these have a leveraged effect upon the exhaust effort because they are being multiplied with the pressure ratio of the turbine.

What is needed in the art is a manifold, a turbomachine with such a manifold, a turbocharger with such a turbomachine and an internal combustion engine with such a manifold, wherein the aforementioned disadvantages are at least reduced, and optionally no longer occur.

SUMMARY OF THE INVENTION

According to a first aspect, the present invention provides a manifold is created for deflecting a flow of a medium flowing through the manifold from an inlet side to an outlet side, wherein the manifold includes a wall which restricts a flow volume of the manifold and a diffuser section which is centrally arranged in the flow volume on the inlet side. The diffuser section is designed as a single component with the wall. By way of the diffuser section, which is arranged centrally on the inlet side, the pressure loss across the manifold can be significantly reduced. In particular, recirculation is minimized at a turbine hub adjacent to the diffuser section when the manifold is used with a turbine. The fact that the diffuser section is designed as a single component with the wall allows for a uniquely optimized flow guidance, whereby in particular, flow separation can be at least largely avoided, optionally prevented. Last, but not least, the efficiency of an internal combustion engine with which the manifold is used can thus be increased. The diffuser section which is arranged centrally on the inlet side also has the advantage of making it more difficult for a turbine wheel to be pushed out axially in the event of a rupture, so that the proposed manifold has improved containment properties in conjunction with a turbine with which it is used.

The fact that the diffuser section is arranged centrally on the inlet side means in particular, that the diffuser section is arranged centrally on the inlet side of the manifold, in particular on an inflow-side main flow axis, pointing along a local main flow direction, of the medium flowing into the diffuser.

The diffuser section is constructed in particular of the same material as the wall.

According to a further development of the present invention, it is provided that during operation of the manifold the diffuser section is arranged with flow around it on the inlet side in the flow volume. This means in particular that the medium flowing through the manifold flows around the diffuser section during operation of the manifold. This proves to be particularly favorable for flow guidance in the manifold, wherein pressure loss across the manifold is minimized in a particularly advantageous manner. In particular, the diffuser section is a solid element or an element closed off on all sides with respect to the flowing medium which is arranged centrally in the flow volume on the inlet side, through which the medium does not flow; rather, the medium flowing through the manifold surrounds the diffuser section.

According to a further development of the present invention it is proposed that the diffuser section is designed as a hub diffuser for a turbomachine. In this way, it is possible to influence particularly favorably the outflow behavior of the medium, from a hub of the turbomachine, in particular a hub of a converter device for converting flow energy into rotational energy—or possibly also vice versa, depending on the design of the turbomachine—in particular of a turbine wheel. The diffuser section is designed in particular as a hub diffuser and is arranged to connect directly optionally without radial offset to the hub of the turbomachine, in particular along its entire circumference around the main flow axis without radial offset.

According to a further development of the present invention it is proposed that the diffuser section is shaped from the wall. This represents a particularly flow-enhancing as well as a structurally particularly simple design of the manifold, wherein the diffuser section is created quasi (that is, so to speak, effectively, or essentially, herein) from the wall. In particular, the diffuser section is shaped from an outside wall section of the wall.

According to a further development of the present invention it is proposed that the wall—in the direction of curvature of the manifold—has an inside wall section curved with a first, smaller radius of curvature and—in the direction of curvature of the manifold—has a curved outside wall section having a second, larger radius of curvature, wherein the outside wall section is formed into the flow volume in order to create the diffuser section. This represents a particularly flow-enhancing as well as structurally simple design of the manifold, with the diffuser section being created quasi from the outside wall section. In particular, the outside wall section is inverted into the flow volume in order to create the diffuser section. Due to its curved geometry, the manifold has—in the direction of curvature or deflection—a region with a smaller radius of curvature and a region with a larger radius of curvature. In this context the term "inside" refers to the area of the smaller radius of curvature. Thus, the inside wall section is that section of the wall which is located in the area of smaller radius of curvature—in this sense "inside", quasi inside the curve; accordingly, the term "outside" in this context refers to the area with a larger radius of curvature. Thus, the outside wall section is that section of the wall which is located in the area of the larger radius of curvature—in this sense "outside", quasi at the outer edge of the curve.

The inside wall section optionally has a formed—in section that is formed into the flow volume and is drawn in the direction of flow, that is, in the desired direction of flow of the medium.

The formed-in section optionally has a tip oriented toward the outlet side.

In a longitudinal sectional view of the manifold, the inside wall section optionally has at least one turning point in the region of the formed-in section.

According to a second aspect, the present invention provides a manifold for deflecting the flow of a medium flowing through the manifold from an inlet side of the manifold to an outlet side of the manifold, wherein the manifold has a wall restricting a flow volume of the manifold, wherein the wall—in direction of curvature of the manifold—has a curved inside wall section with a first, smaller radius of curvature and—in the direction of curvature of the manifold—has a curved outside wall section with a second, larger radius of curvature. The inside wall section has a formed-in section which is formed into the flow volume and is drawn in in the direction of flow, in other words in the desired direction of flow of the medium. In this way, a Carnot pressure drop can in particular be advantageously reduced across the manifold, wherein the underlying phenomenon is also referred to as Carnot pressure. In particular, flow separation in the region of the inside wall section can be at least mostly avoided, optionally prevented. If the manifold is used in connection with an internal combustion engine, in particular in the exhaust gas path of the internal combustion engine, in particular as an exhaust manifold of a turbine of a turbocharger, the efficiency of the internal combustion engine can be advantageously increased in this way. The fact that the formed-in section is drawn in in the direction of flow means in particular that the formed-in section is drawn towards the outlet side, in particular that it is turned in or turned out towards the outlet side, depending on the viewing direction.

Due to its curved geometry, the manifold has—in the direction of curvature or deflection—a region with a smaller radius of curvature and a region with a larger radius of curvature. In this context the term "inside" refers to the area of the smaller radius of curvature. Thus, the inside wall section is that section of the wall which is located in the area of smaller radius of curvature—in this sense "inside", quasi inside the curve; accordingly, the term "outside" in this context refers to the area with a larger radius of curvature. Thus, the outside wall section is that section of the wall which is located in the area of the larger radius of curvature—in this sense "outside", quasi at the outer edge of the curve.

According to a further development of the present invention, it is provided that the formed-in section has a tip oriented towards the outlet side. This represents a particularly flow-enhancing design of the formed-in section. In particular, the tip of the formed-in section is shaped as a cap or peak, or as a horn.

In accordance with a further development of the present invention, it is provided that—in a longitudinal sectional view of the manifold—the inside wall section has at least one turning point in the region of the formed-in section. This design has proven to be particularly favorable in terms of flow, especially with regard to reducing the pressure loss across the manifold. The longitudinal sectional view is in particular a view in one sectional plane in which at least one main flow axis of the manifold, optionally both the inlet-side main flow axis and an outlet-side main flow axis, are positioned. Optionally, a contour line of the inside wall section has the at least one turning point in the longitudinal section view. Optionally, the inside wall section, in particular the contour line of the inside wall section, has exactly one—and only one—turning point in the longitudinal sectional view of the manifold.

According to the second aspect, the manifold includes optionally a diffuser section centrally arranged in the flow volume on the inlet side. The diffuser section is designed as a single component with the wall.

In operation of the manifold, the diffuser section is optionally arranged in the flow of the flow volume on the inlet side.

The diffuser section is optionally designed as a hub diffuser for a turbomachine.

The diffuser section is optionally shaped from the wall, in particular from the outside wall section.

The outside wall section is optionally formed into the flow volume to create the diffuser section.

The manifold according to the first aspect and the manifold according to the second aspect can more specifically be combined with one another. The manifold according to the second aspect optionally includes at least one characteristic which is described in reference to the manifold according to the first aspect. Conversely, the manifold according to the first aspect includes optionally at least one characteristic which is described in reference to the manifold according to the second aspect.

In the context of the present technical teachings, according to at least one aspect selected from the first aspect and the second aspect, a manifold is understood to be in particular a pipe section having a deflection for a medium flowing through the pipe section.

In one embodiment of the present invention according to at least one aspect selected from the first aspect and the second aspect, the manifold is a 90° manifold, that is, the manifold has a 90° deflection for the medium flowing through it.

According to at least one aspect selected from the first aspect and the second aspect, the manifold optionally includes a first flange on the inlet side and a second flange on the outlet side, wherein the flanges are each arranged for connecting—in particular fluidically and/or mechanically—the manifold to a flow-conducting component, in particular a pipe section, adjoining the manifold.

In one embodiment of the present invention according to at least one aspect selected from the first aspect and the second aspect, the manifold is designed as an outflow manifold, in other words it is designed to be arranged on the downstream side of a flow device and to receive and to discharge the medium flowing away from the flow device. In particular, the manifold is designed as an outflow manifold for a turbomachine.

The manifold proposed herein according to at least one aspect selected from the first aspect and the second aspect can optionally be manufactured in a generative manufacturing process or in an additive manufacturing process and is optionally manufactured in an additive manufacturing process or a generative manufacturing process. Such a process allows for more complex geometries to be easily produced efficiently and cost effectively. Alternatively, production by casting, in other words in a casting process, is also possible. In particular, insert components and/or slides can be used to produce the geometry of the manifold.

According to a further embodiment of the present invention according to at least one aspect selected from the first aspect and the second aspect, it is provided that the outside wall section—in a sectional plane perpendicular to a cross-sectional plane and to a longitudinal sectional plane of the manifold—has two indentations arranged laterally from the diffuser section and formed into the flow volume. This design has proven to be particularly favorable in terms of flow, especially with regard to the pressure loss across the manifold. A cross-sectional plane is a sectional plane on which at least one main flow axis of the manifold, in particular the inlet-side main flow axis and/or the outlet-side main flow axis, is positioned perpendicular. The herein considered sectional plane in which the outside wall section has the two indentations, is optionally perpendicular to a first cross-sectional plane to which the inlet-side main flow axis of the manifold is perpendicular; and it is additionally perpendicular to the longitudinal sectional plane. In contrast, the herein considered sectional plane is optionally aligned parallel to a second cross-sectional plane to which the outlet-side main flow axis is perpendicular; this applies in particular in the case where the manifold is designed as a 90° manifold, in other words as a manifold with 90° deflection, in which case the inlet side main flow axis and the outflow-side main flow axis are perpendicular to one another.

The indentations are in particular arranged respectively laterally, each on a separate side, from the diffuser section. In particular, the two indentations are optionally arranged symmetrically, in particular mirror-symmetrically with respect to a mirror plane perpendicular to the sectional plane and which is aligned along the diffuser section, on both sides of the diffuser section.

The present invention also provides a turbomachine with an inlet-side inlet region and an outlet-side outlet region, wherein the turbomachine in the outlet side outlet region has a manifold according to the invention or a manifold according to at least one of the embodiments described above. Advantages which were already discussed in connection with the manifold, arise in particular in connection with the turbomachine.

The manifold connects optionally with its inlet side to a flow outlet of a converter section of the turbomachine. In particular, a converter device of the turbomachine is arranged in the converter section. The converter device is in particular a turbine wheel of the turbomachine, designed optionally as a turbine or exhaust gas turbocharger.

According to a further development of the present invention it is provided that the diffuser section in the embodiment of a hub diffuser connects directly to a hub of the turbomachine. In this way, the pressure loss over the manifold is advantageously notably reduced. In addition, the containment properties for the turbomachine are advantageously improved, in particular by the diffuser section preventing the hub and, in particular, the transducer device from being moved in the axial direction. The diffuser section is designed in particular as a hub diffuser.

The hub of the turbomachine is in particular a hub of the converter device, in particular of the turbine wheel.

The diffuser section, which is designed as a hub diffuser, optionally adjoins the hub of the turbomachine directly without radial offset. In particular, the diffuser section optionally adjoins the hub of the turbomachine over its entire circumference, that is in particular along a closed circumferential line, without radial offset.

According to a further development of the present invention, the turbomachine is designed as a turbine. In this embodiment the already discussed advantages are provided in particular. The converter device in this case is in particular a turbine wheel.

The turbomachine is designed in particular as a turbine of a turbo charger.

The present invention also provides a turbo charger which has a first turbomachine in the embodiment of a compressor and a second turbomachine in the embodiment of a turbine which is effectively drive-connected to the first turbomachine. The second turbomachine is designed as an inventive turbomachine or as a turbomachine according to at least one of the previously described embodiments. In connection with the turbocharger, advantages result in particular which were already explained in connection with the manifold and the turbomachine.

The present invention also provides an internal combustion engine which has a manifold according to the invention or a manifold according to at least one of the previously described embodiments or which has a turbocharger according to the invention or a turbocharger according to at least one of the previously described embodiments. In connection with the internal combustion engine advantages result in particular which were already explained in connection with the manifold and the turbocharger. In particular, the manifold proposed herein advantageously increases an efficiency of the internal combustion engine, especially by reducing the amount of exhaust effort to be performed by the internal combustion engine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DETAILED DESCRIPTION OF THE INVENTION

Figure 1:
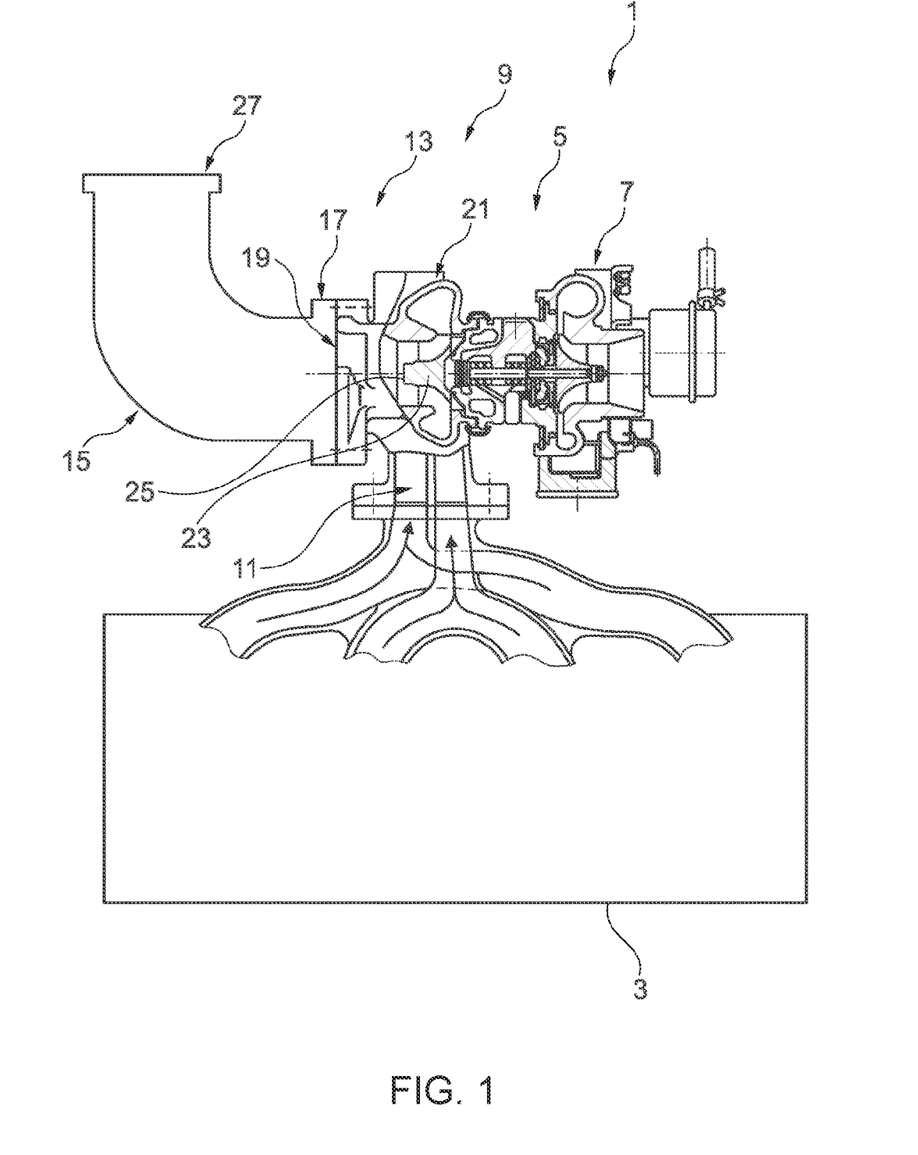
FIG. 1 is a schematic presentation of a design example of an internal combustion engine with a design example of a turbocharger, a design example of a turbomachine and a design example of a manifold.

FIG. 1 is a schematic presentation of an internal combustion engine 1 with an engine block 3 and a turbocharger 5. Turbocharger 5 has a first turbomachine 7 in the embodiment of a compressor and a second turbomachine 9 in the embodiment of a turbine which is effectively drive-connected to first turbomachine 7. Second turbomachine 9 has an inlet region 11 on the inlet side and an outlet region 13 on the outlet side. In outlet region 13 on the outlet side, second turbomachine 9 has a manifold 15, in particular with a 90° deflection. Manifold 15 connects with an inlet side 17 to a flow outlet 19 of a converter section 21 of second turbomachine 9. A converter device 23 is arranged in converter section 21, in this case in particular a turbine wheel of second turbomachine 9 in the embodiment of a turbine.

Second turbomachine 9 has a hub 25 in converter section 21; hub 25 is in particular the hub of converter device 23, in particular the hub of the turbine wheel.

Figure 2:
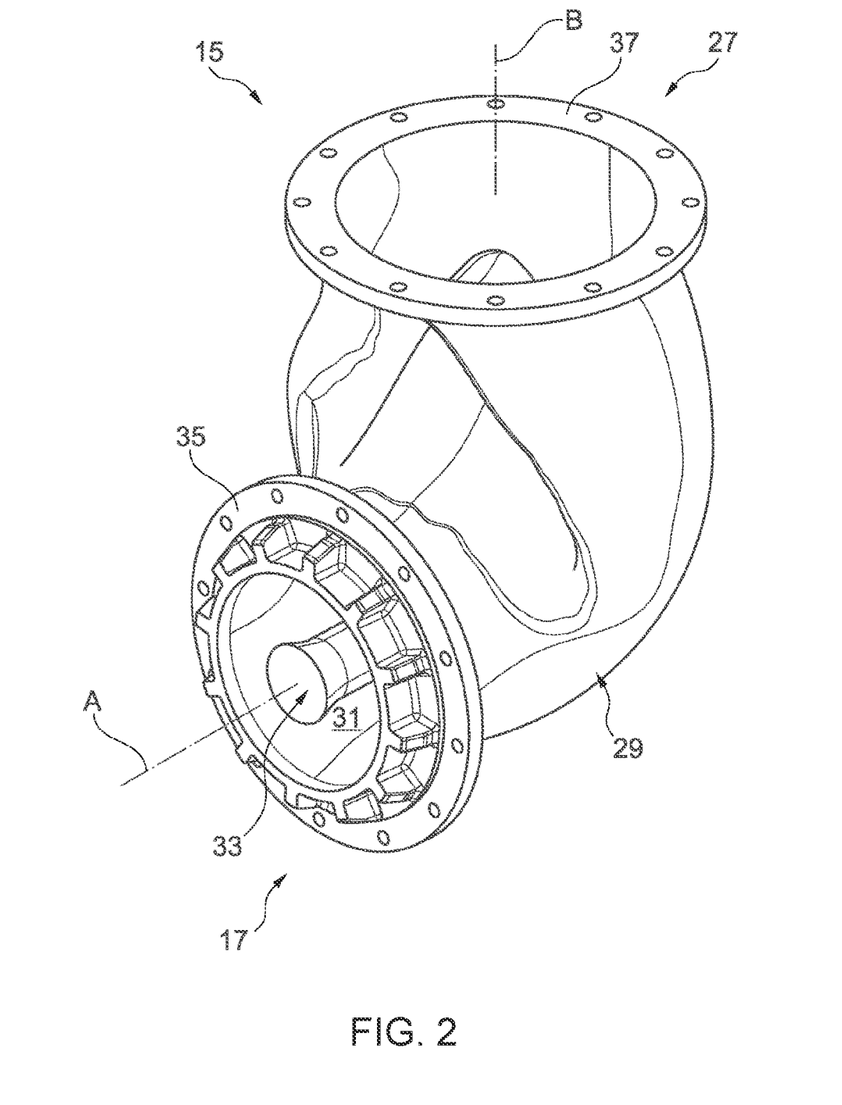
FIG. 2 is a first presentation of the design example of the manifold according to FIG. 1.

FIG. 2 is a first presentation of the design example of manifold 15 shown in FIG. 1.

Same and functionally same elements are identified in the drawings with the same reference so that reference will be made to the respectively preceding description.

Manifold 15 serves to deflect the flow of a medium flowing through manifold 15 from inlet side 17 to an outlet side 27, in this case in particular exhaust gas from internal combustion engine 1. Manifold 15 includes wall 29 which restricts a flow volume 31 of manifold 15. A diffuser section 33 is arranged centrally in flow volume 31 on the inlet side, that is, in particular centrally on a main flow axis A on the inlet side and is designed as a single component with wall 29. This can significantly reduce a pressure drop across manifold 15. In particular, recirculation at hub 25 adjacent to diffuser section 33 is minimized. The integral design of diffuser section 33 with wall 29 enables optimized flow guidance, whereby in particular flow separation can be at least mostly avoided, optionally prevented. Last but not least, the efficiency of internal combustion engine 1, in particular of engine block 3, can thus be increased. In addition, diffuser section 33 arranged centrally on the inlet side effectively prevents axial displacement of converter device 23, that is the turbine wheel, in the event of a rupture, so that manifold 15 provides improved containment properties for second turbomachine 9 which is in the embodiment of a turbine.

Diffuser section 33 is designed in particular as a hub diffuser and optionally adjoins hub 25 directly, in particular without radial offset, in particular entirely without radial offset.

Diffuser section 33 is optionally arranged within flow volume 31 on the inlet side during operation of manifold 15 with medium flowing around it.

Manifold 15 optionally has an inlet-side, first flange 35 and an outlet-side, second flange 37.

Manifold 15 is optionally manufactured by way of a generative manufacturing process and/or by way of an additive manufacturing process. Alternatively, manifold 15 is cast.

FIG. 2 also shows a main flow axis B on the outlet side.

Figure 3:
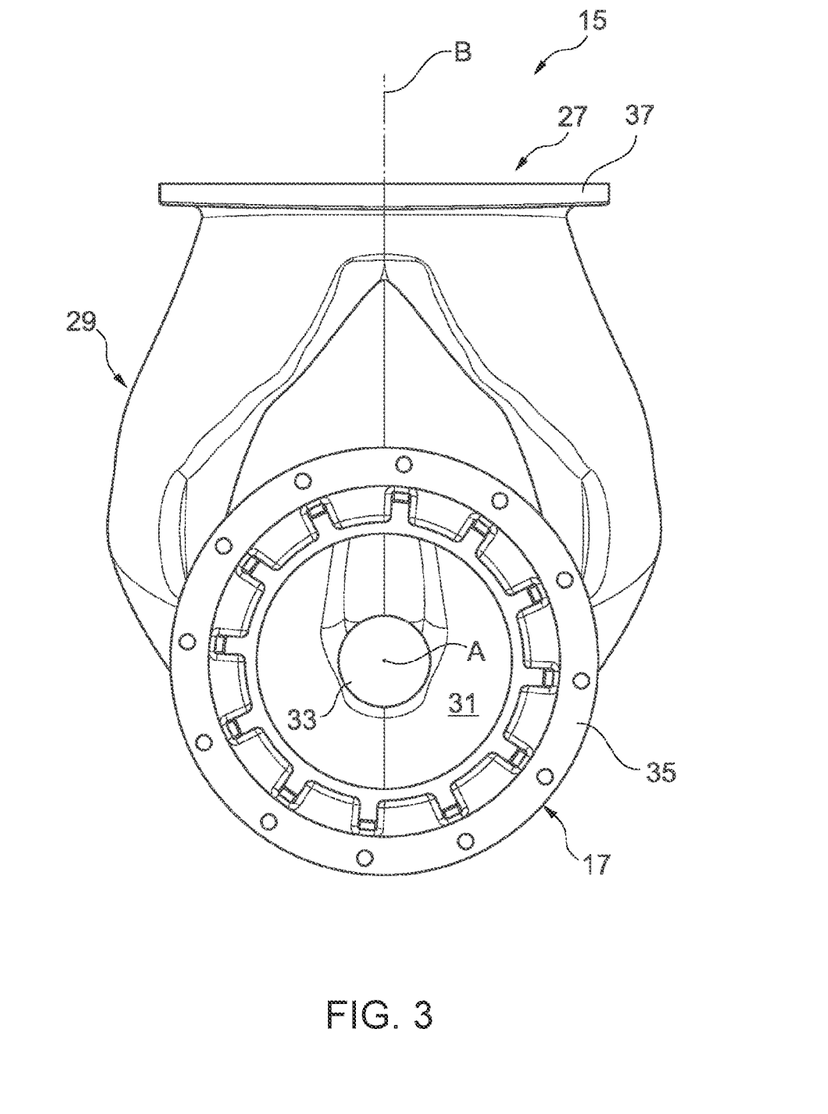
FIG. 3 is a second presentation of the inlet side of the manifold according to FIG. 2.

FIG. 3 shows a second, inflow-side representation of manifold 15 according to FIG. 2. In this representation, it becomes particularly clear that diffuser section 33 is arranged centrally on main flow axis A on the inlet side.

Figure 4:
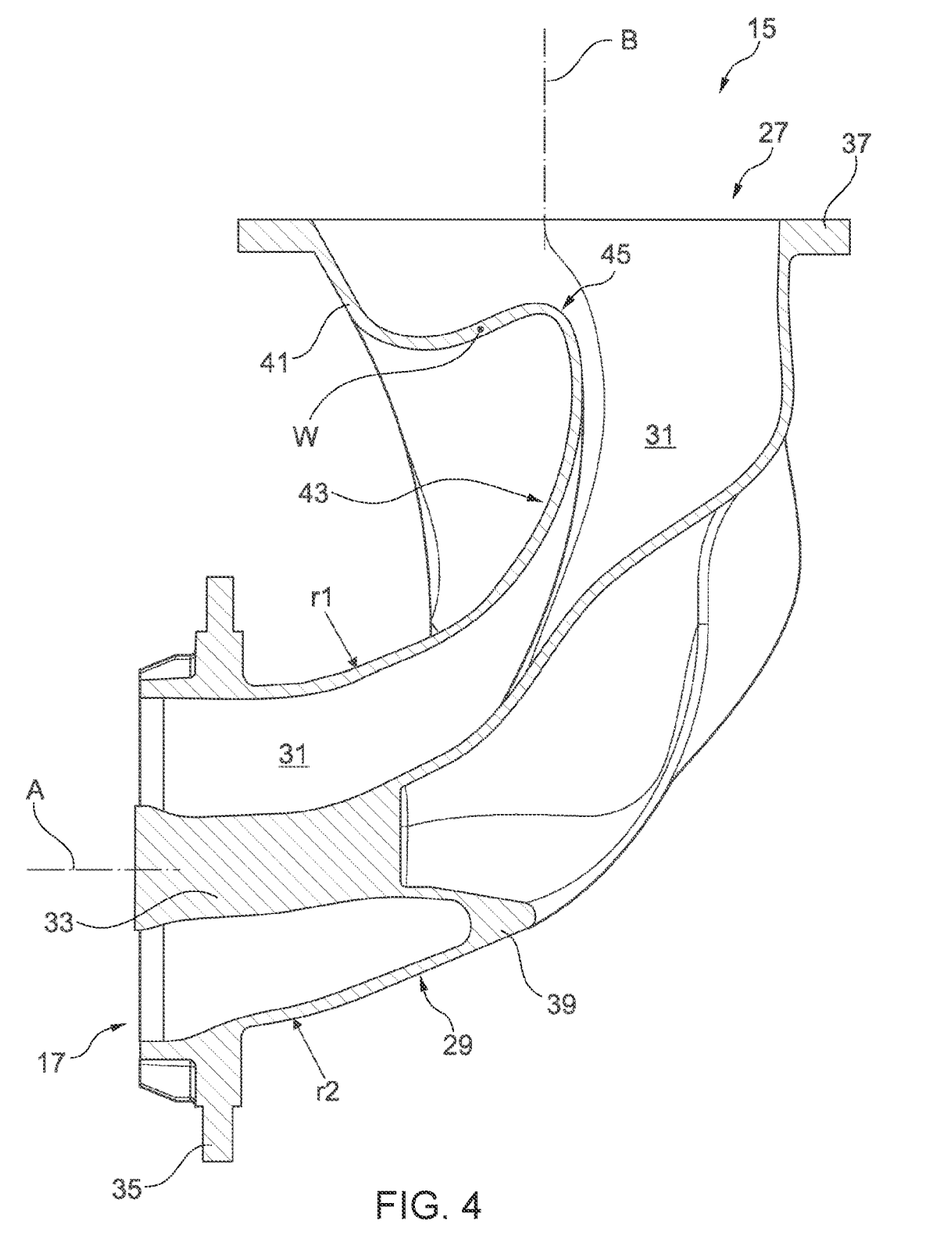
FIG. 4 is a longitudinal sectional presentation of the manifold according to FIGS. 2 and 3.

FIG. 4 shows a representation of manifold 15 according to FIGS. 2 and 3 in a longitudinal sectional view, that is, in particular in a sectional plane in which both the inlet-side main flow axis A and the outlet-side main flow axis B are located. In particular, it is clear in this sectional view that diffuser section 33 is optionally shaped from wall, 29, in particular from an outside wall section 39 of wall 29.

Wall 29 has in particular a curved inside wall section 41 with a first, smaller radius of curvature r1, and curved outside wall section 39 with a second, larger radius of curvature r2. Outside wall section 39 is formed into flow volume 31, in particular inverted, to create diffuser section 33.

Inside wall section 41 has a formed-in section 43 which is formed into flow volume 31 and is drawn in the direction of flow, in other words, towards outlet side 27, in particular—depending on the viewing direction from outside or inside flow volume 31—turned in or turned out. In this way, in particular, a Carnot pressure loss across manifold 15 can be reduced. In particular, flow separation in the region of inside wall section 41 can be at least largely avoided, optionally prevented. In particular, the efficiency of internal combustion engine 1, in particular of engine block 3, can be advantageously increased also in this manner.

Formed-in section 43 in particular has a tip 45 oriented toward outlet side 27, wherein tip 45 is in particularly in the form of a cap, a peak, or a horn.

In the longitudinal sectional view of FIG. 4, inside wall section 41 optionally features at least one, optionally exactly one, turning point W in the region of formed-in section 43. In particular, a contour line of inside wall section 43 shows turning point W.

Figure 5:
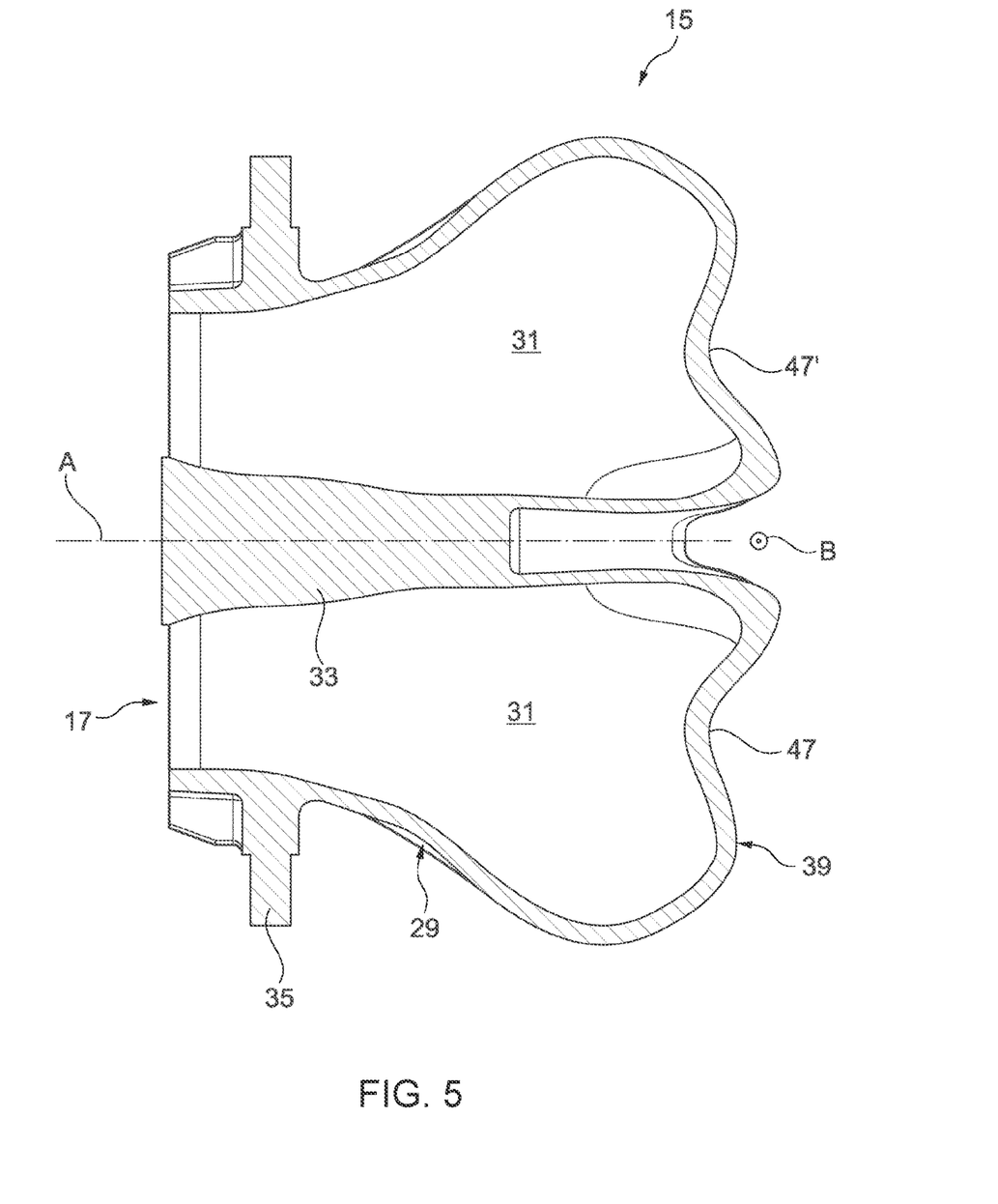
FIG. 5 is a sectional presentation of the manifold according to FIGS. 2 to 4 in a sectional plane perpendicular to a longitudinal sectional plane and perpendicular to a cross-sectional plane.

FIG. 5 shows a sectional view of manifold 15 according to FIGS. 2 to 4 in a sectional plane which is perpendicular to the longitudinal sectional plane according to FIG. 4 and perpendicular to a cross-sectional plane, namely perpendicular to that cross-sectional plane to which, in turn, the inlet-side main flow axis A is perpendicular. Accordingly, main flow axis A on the inlet side is located in the sectional plane of FIG. 5. Main flow axis B on the outlet side is perpendicular to the sectional plane of FIG. 5. The view in FIG. 5 shows that in an optional embodiment outside wall section 39 has two indentations 47, 47', each arranged laterally, in particular symmetrically, to diffuser section 33 and formed into flow volume 31. This design has proven to be particularly favorable to flow.

Figure 6:
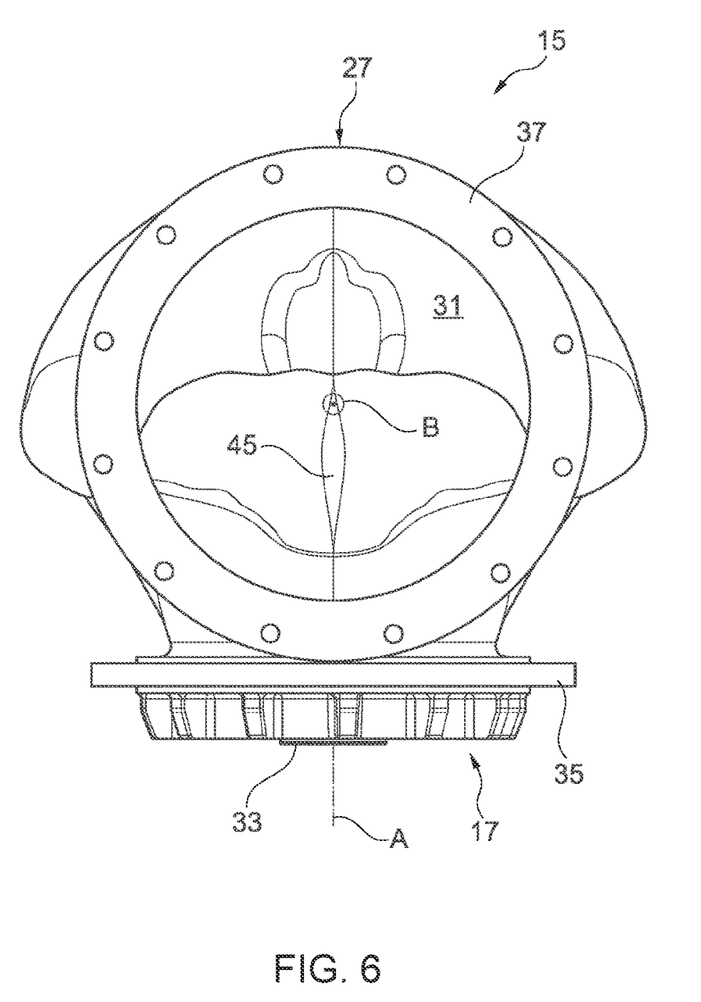
FIG. 6 is an additional presentation of the outlet side of the manifold according to FIGS. 2 to 5.

FIG. 6 shows an additional outlet-side representation of manifold 15 according to FIGS. 2 to 5. Here, in particular, tip 45 of formed-in section 43 is clearly visible since it is facing toward the viewer.

Figure 7:
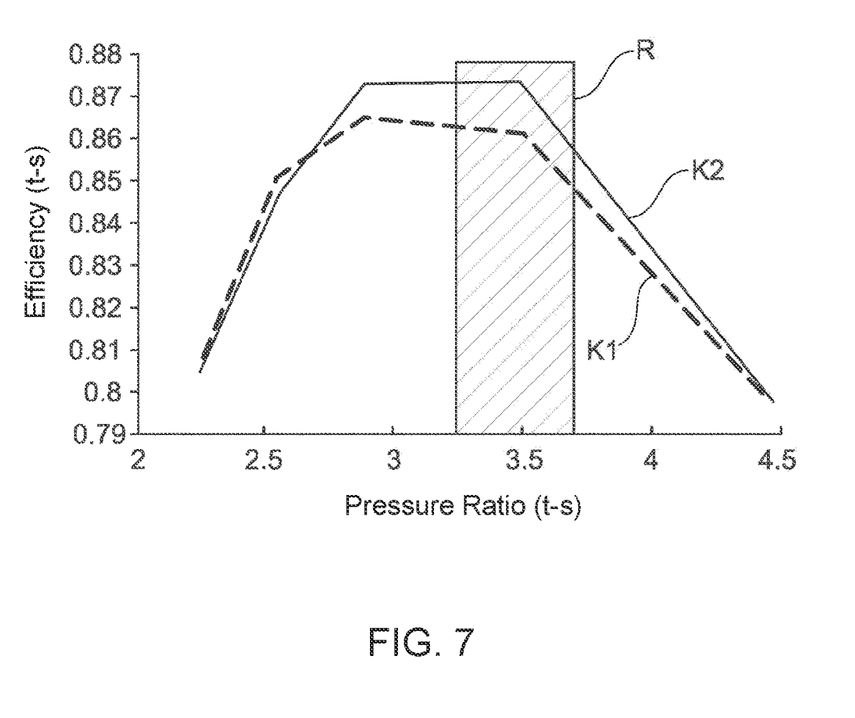
FIG. 7 is a diagrammatic presentation of the operating mode of the manifold according to FIGS. 2 to 6.

FIG. 7 shows another diagrammatic representation of an effect of manifold 15 according to FIGS. 2 to 6, where an efficiency of a turbine in arbitrary units is plotted against a pressure ratio—also in arbitrary units—of the turbine. A first, dashed curve K1 shows the efficiency as a function of the pressure ratio when a conventional manifold is used. A second, solid curve K2 shows the efficiency as a function of the pressure ratio when using inventive or inventively optional manifold 15. In addition, an operating range of manifold 15 is shown in a cross-hatched rectangle R. The data reproduced here are based on calculations performed by way of CFD (computational fluid dynamics). These calculations show—as shown in the diagram—that herein proposed manifold 15 facilitates significantly increased efficiency for the turbine in its operating range.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A manifold for deflecting a flow of a medium flowing through the manifold from an inlet side of the manifold to an outlet side of the manifold, the manifold comprising:
the inlet side;
the outlet side, the manifold defining a first flow axis associated with the inlet side of the manifold and a second flow axis associated with the outlet side of the manifold, the first flow axis and the second flow axis being arranged at an angle relative to one another;
a wall at least partially defining and thereby restricting a flow volume of the manifold, the wall including an inside wall section that is curved and an outside wall section that is curved, the inside wall section including a first radius of curvature, the outside wall section including a second radius of curvature that is larger than the first radius of curvature, the inside wall section including a formed-in section which is formed into the flow volume and is drawn in a direction of flow of the medium; and
a diffuser section arranged centrally in the flow volume on the inlet side, the diffuser section being a single component with the wall and being a hub diffuser configured for a turbomachine, the diffuser section being configured such that, during an operation of the manifold, the medium flows around and thus not through the diffuser section, the outside wall section—in a sectional plane perpendicular to a cross-sectional plane and to a longitudinal sectional plane of the manifold—including two indentations which are arranged laterally to the diffuser section and are formed into the flow volume.

2. The manifold according to claim 1, wherein the manifold is configured for being a part of an internal combustion engine.

3. The manifold according to claim 1, wherein the formed-in section includes a tip oriented towards the outlet side.

4. The manifold according to claim 3, wherein, in a longitudinal sectional view of the manifold, the inside wall section has at least one turning point in a region of the manifold corresponding to the formed-in section.

5. A turbomachine, comprising:
an inlet-side inlet region;
an outlet-side outlet region; and
a manifold on the outlet side outlet region, the manifold being configured for deflecting a flow of a medium flowing through the manifold from an inlet side of the manifold to an outlet side of the manifold, the manifold including:
the inlet side;
the outlet side, the manifold defining a first flow axis associated with the inlet side of the manifold and a second flow axis associated with the outlet side of the manifold, the first flow axis and the second flow axis being arranged at an angle relative to one another;
a wall at least partially defining and thereby restricting a flow volume of the manifold, the wall including an inside wall section that is curved and an outside wall section that is curved, the inside wall section including a first radius of curvature, the outside wall section including a second radius of curvature that is larger than the first radius of curvature, the inside wall section including a formed-in section which is formed into the flow volume and is drawn in a direction of flow of the medium; and
a diffuser section arranged centrally in the flow volume on the inlet side, the diffuser section being a single component with the wall and being a hub diffuser, the diffuser section being configured such that, during an operation of the manifold, the medium flows around and thus not through the diffuser section, the outside wall section—in a sectional plane perpendicular to a cross-sectional plane and to a longitudinal sectional plane of the manifold—including two indentations which are arranged laterally to the diffuser section and are formed into the flow volume.

6. The turbomachine according to claim 5, wherein the turbomachine includes a hub, the diffuser section adjoining the hub directly without a radial offset.

7. The turbomachine according to claim 5, wherein the turbomachine is a turbine.

8. The turbomachine according to claim 7, wherein the turbine is configured for being a part of a turbocharger.

9. The turbomachine according to claim 7, wherein the turbine is configured for being a part of a turbocharger which further includes another turbomachine formed as a compressor, the turbine being configured for being drive-connected with the compressor.

* * * * *